United States Patent [19]

Jenkins

[11] Patent Number: 5,263,007
[45] Date of Patent: Nov. 16, 1993

[54] SEISMIC ENERGY SOURCE

[75] Inventor: Philip J. Jenkins, Pearland, Tex.

[73] Assignee: Western Atlas International, Inc., Houston, Tex.

[21] Appl. No.: 937,596

[22] Filed: Aug. 31, 1992

[51] Int. Cl.⁵ ..................... G01V 1/40; H04R 23/00
[52] U.S. Cl. ................................. 367/144; 181/120
[58] Field of Search ............... 367/144; 181/119, 120, 181/402

[56] References Cited

U.S. PATENT DOCUMENTS

| | | | |
|---|---|---|---|
| 5,001,679 | 3/1991 | Harrison | 367/144 |
| 5,018,115 | 5/1991 | Pascouet | 367/144 |
| 5,144,596 | 9/1992 | Pascouet | 367/144 |

Primary Examiner—Ian J. Lobo
Attorney, Agent, or Firm—Paul S. Madan

[57] ABSTRACT

A seismic energy source for producing pressure pulses is disclosed. The source contains a substantially symmetrical main chamber for storing compressed fluid. Two shuttles adapted to abut against each other are slideably placed around the housing to sealingly enclose the chamber. A separate control chamber for each shuttle is formed to urge its associated shuttle against the other shuttle when pressurized fluid is supplied to the control chamber. A separate firing chamber is formed for each shuttle between the shuttle and the housing. The firing chambers are activated by the fluid from the main chamber to simultaneously move both the shuttles away from each other to allow the compressed fluid to discharge from the main chamber into the surrounding medium. A separate relief valve is connected between each control chamber and the main chamber which allows the fluids from the control chamber to discharge into the main chamber when the control chamber pressure exceeds the main chamber pressure by a predetermined value.

6 Claims, 4 Drawing Sheets

SEISMIC ENERGY SOURCE

BACKGROUND OF THE INVENTION

1. Field of the Invention

The present invention relates generally to an apparatus and method for use in marine seismic exploration and more particularly to an energy source for generating pressure pulses in a body of water.

2. Description of the Prior Art

In marine seismic exploration, to obtain geophysical information relating to the substrata located below a body of water, acoustic energy in the form of pressure pulses or shock waves is released into the water every few seconds. The shock waves propagate into the substrata beneath the water from where they are reflected and refracted back to the water. The returning shock waves are detected by a plurality of sensors (usually hydrophones) placed in seismic cables towed behind a vessel. The useful data contained in the signals produced by the sensors is processed to determine the geophysical structure of the surveyed substrata.

Air guns or gas guns are most commonly used as the acoustic energy sources or transmitters to produce shock waves having known characteristics. State of the art air guns normally have an annular housing which contains an integral chamber for storing a volume of compressed air. A sleeve-type shuttle sealingly encloses a portion of the housing to prevent compressed air from escaping into the surrounding medium, which is usually water. Means are provided to move the shuttle to break the seal, which permits the compressed air to escape into the surrounding water. The air guns which use a sleeve-type shuttle as described above are sometimes referred to in the oil and gas industry as the sleeve-type air guns. U.S. Pat. No. 4,472,794, issued to Chelminski on Sep. 18, 1984, U.S. Pat. No. 4,623,033 (the "'033 Patent"), issued to Harrison on Nov. 18, 1988 and U.S. Pat. No. 5,001,679 (the "'679 Patent") also issued to Harrison on Mar. 19, 1991, disclose two of the more commonly used sleeve-type air guns for performing marine geophysical surveying.

Chelminski discloses an air gun that has a housing which defines a main chamber for storing compressed air and a firing chamber. The main chamber has a discharge port. A movable sleeve type shuttle is placed within the housing to sealingly enclose the discharge port when it is in its normal closed position. A solenoid valve applies high pressure air to the firing chamber, which causes the sleeve shuttle to move away from the closed position. A relatively long acceleration distance for the sleeve shuttle is provided so that the sleeve shuttle may attain a high velocity before it passes over the discharge ports. When the sleeve shuttle opens the ports, the compressed air discharges from the main chamber to the surrounding medium creating a pressure pulse.

The Harrison air gun disclosed in the '033 patent also contains a housing that has a main chamber for storing compressed air. The housing has an annular opening around the main chamber. A sleeve is affixed around the housing that encloses a substantial portion of the main chamber. One face of the fixed sleeve contains a groove for housing a seal. A single sleeve-type shuttle having a surface adapted to abut against the face of the fixed sleeve containing the seal is slideably placed around the housing. The shuttle is pressed against the fixed sleeve to sealingly enclose the pressurized air in the main chamber. To discharge the pressurized air into the surrounding medium, the shuttle is moved away from the sleeve thereby allowing the compressed air to escape into the surrounding medium. After the pressurized air has escaped, the shuttle is forced against the fixed sleeve and the main chamber is filled with the compressed air for the next firing cycle.

The Harrison air gun disclosed in the '033 patent and the Chelminski air guns have been found to take several milliseconds to release most of the compressed air from their respective main chambers. An ideal pressure pulse will be obtained when the entire air can be released instantaneously. On a pressure versus time graph, such an ideal pulse will be a spike at the moment the air is released.

The second Harrison air gun disclosed in the '679 patent is a modified version of the '033 air gun. The '679 air gun, like the '033 air gun, contains a fixed sleeve having a fixed seal that encloses substantially all of the main chamber and a shuttle which abuts against the fixed sleeve to seal the chamber. A second shuttle 24 containing a lip is placed around a portion of the final sleeve. To fire the air gun, the first shuttle 18 is moved away from the fixed sleeve 12, which allows the pressurized air to pass through the opening created between the fixed sleeve and the shuttle. This air then forces only the second shuttle but not the seal to move a relatively short distance away from the first shuttle.

Both the '033 and the '679 air guns have a shuttle which abuts against a fixed sleeve. The fixed sleeve enclosed most of the chamber. The size of the opening for discharging the compressed air is defined by the movement of the shuttle. The opening is made near the end of the fixed shuttle, thereby forcing the compressed air to travel nearly the entire length of the chamber before it can discharge into the surrounding medium. Further, the '679 air gun is much more complex to manufacture than the '033 air gun, without offering any significant advantages over the '033 air gun.

The quality of the pressure pulses produced by the Harrison and Chelminski air guns is compromised due to the relatively low speed with which the opening is created and by placing the opening near the end of the main chamber by the size of the opening created for discharging the pressurized air in a given period of time. The pulse shape will be improved if a larger escape opening can be created at the geometric center of the main chamber in the same or less time period as compared to these prior art air guns. It is, therefore, highly desirable to have an air gun which discharges the pressurized air in less time than the presently used air guns. The present invention provides an air gun which is capable of discharging substantially all of the pressurized air in less time as compared to the presently used air guns.

In practice, several different capacity air guns placed in a spaced relationship are used to produce a pressure wave signature to perform geophysical surveying. The spaced arrangement is referred to as an array or subarray. One or more than one air gun arrays are towed beneath the water surface behind a marine vessel. The capacity of an air gun may be changed by installing inserts therein to alter the air chamber effective volume. In this manner, the same air gun may be used to cover a given capacity range. For example, an air gun having a maximum capacity of 300 cubic inches may be used to cover a range up to the maximum capacity of 300 cubic inches. Because of the great weight and overall size of the air guns, it is highly desirable to have an air gun which is smaller in size but has larger capacity. Such an air gun, apart from being lighter, may be used for a greater variety of applications. The above noted prior art air guns are, by their design configuration, limited in their capacity. The present invention provides an air gun which has a much greater capacity compared to a comparable size prior art air gun.

The cost to perform marine geophysical surveying is extremely high. It requires the use of, among other things, a vessel, electronic processing equipment, computers, marine sensor cables and highly skilled personnel). The equipment costs several million dollars and the total per hour operating cost is several thousand dollars. Due to the high cost, the surveying activity is performed essentially around the clock for several days or weeks at a time. Since air guns are fired every few seconds for extended periods of time, they frequently fail. This usually requires stopping the entire operation in order to repair or replace the failed air guns. It is, therefore, desirable to have a very reliable air gun which has fewer components and which can be assembled, disassembled and repaired in less time than the prior art air guns. The prior art air guns are fairly complex in their structure and contain a large number of parts. The air gun of the present invention contains less number of parts and is easier to assemble and disassemble compared to the prior art air guns noted above.

SUMMARY OF THE INVENTION

The present invention provides an air gun which is simpler in design, has fewer components, has large capacity per unit size and is capable of discharging compressed air through a larger opening compared to the presently used air guns.

A seismic energy source is disclosed. The energy source contains a housing having a chamber for storing compressed fluid. Two shuttles facing each other are slideably placed around the housing. The shuttles are adapted to meet about the geometrical center of the chamber. A separate control chamber for each shuttle is formed into the energy source to simultaneously urge the shuttles against each other when pressurized fluid is supplied to the control chambers. An air seal between the shuttle surfaces is formed when the shuttles are urged against each other. A separate firing chamber for each shuttle is provided. Pressurized fluid is selectivley supplied simultaneously to the firing chambers, which cause the shuttles to momentarily and simultaneously move away from each other. A valve is provided to control to the firing chambers.

Examples of the more important features of the invention thus have been summarized rather broadly in order that detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which the like elements have been given like numerals and wherein.

DESCRIPTION OF THE PREFERRED EMBODIMENTS

The energy source of the present invention contains two sleeve-type shuttles ("shuttles") slideably placed around a body having a chamber for storing a high pressure fluid, usually air. The shuttles are urged (pressed) against each other about the geometrical center of the chamber, to sealingly enclose high pressure air in the chamber. High pressure air from a common source is supplied first to both control chambers simultaneously and then to the main chamber which under normal operation keep the shuttles pressed against each other. Means are provided for simultaneously and rapidly moving the shuttles away from each other for abruptly releasing the pressurized fluid from the chamber into the surrounding medium.

Air or gas is most commonly used as the operating fluid. Energy sources that use air as the operating fluid are referred to as the air guns. Therefore, for convenience, the disclosure of the preferred embodiment given below is made with respect to an air gun.

Figure 1:
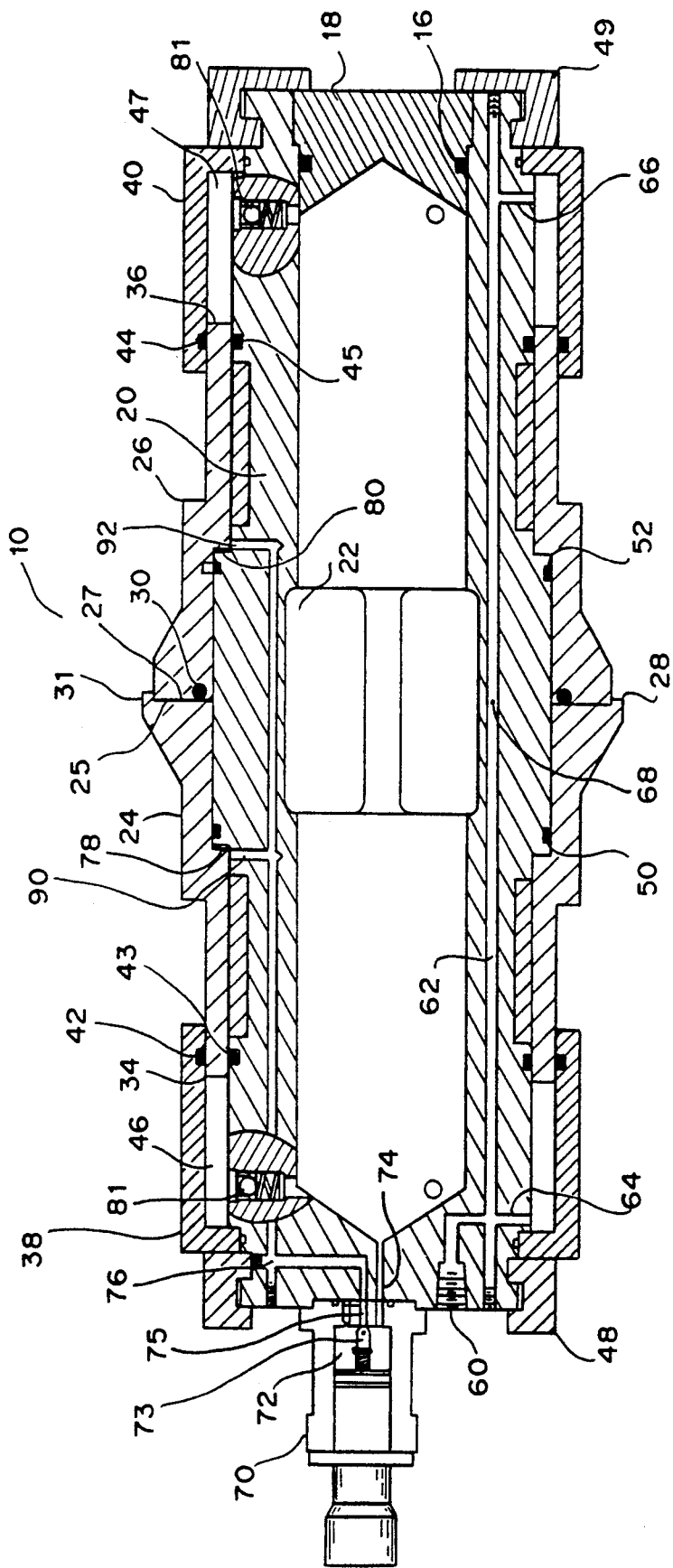
FIG. 1 shows a cross-sectional view of the seismic energy source of the present invention.
Figure 2:
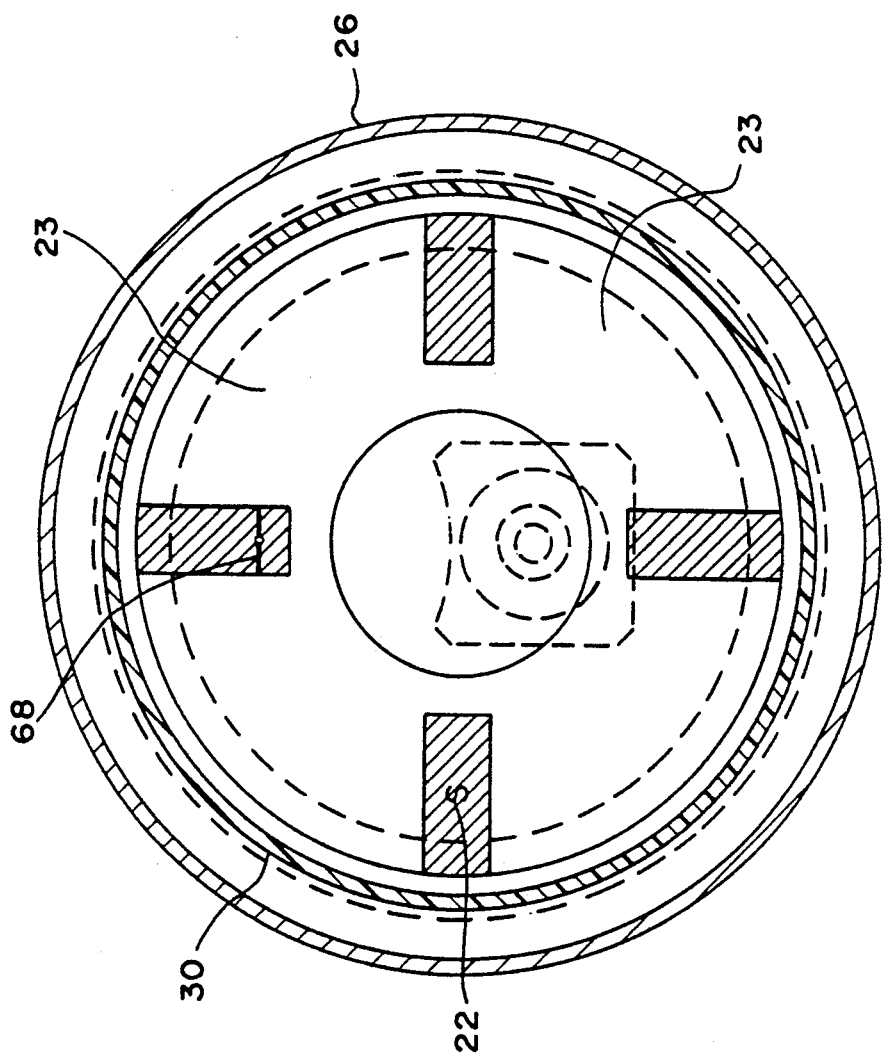
FIG. 2 shows a cross-sectional view of the seismic energy source of FIG. 1 taken along the Sections A—A.

The energy source of the present invention will now be described while referring to FIGS. 1 and 2. The energy source 10 has a body 20 made from a suitable high strength material, generally a steel alloy. A substantially symmetrical chamber 22 having segmented openings 23 (FIG. 2) is formed in the body 20. The chamber 22 is in fluid communication with the area surrounding the body 20 via the openings 23 through the segments of the body 20. Two shuttles 24 and 26 are slideably placed around the body 20 such that their respective inner face surfaces 25 and 27 may abut against each other. A lip 28 is provided around the outer edge of the face surface 25 of the sleeve 24 which surrounds the face surface 27 of the sleeve 26. Alternatively, a lip may be provided on sleeve 26 to surround the face surface 25 of the sleeve 24. The interface plane 31 of the face surfaces 25 and 27 is preferably located at the cross-sectional plane passing through the geometrical volumetric center of the air chamber 22. In this manner, about one-half of the pressurized air volume is on either side of the interface plane 31.

A face seal is provided between the face surfaces 25 and 27 so that when those surfaces are urged against each other, no fluid escapes from the chamber 22 through the interface 31. The face seal is preferably made by making an O-ring groove in the face surface 27. The groove has a depth greater than the O-ring diameter. The O-ring groove opening at the surface 27 is made smaller than the O-ring diameter. An O-ring of suitable material is placed inside the O-ring groove. Because of the undersized opening of the groove at the surface 27 and because the O-ring sits below the surface 27, the O-ring tends to stay in the groove, even when high pressure air passes between the face surfaces 25 and 27. The face surface 25 has a protruding circular lip thereon, which matches the O-ring groove, but has a width less than that of the O-ring groove. When the face surfaces 25 and 27 are pressed against each other, the lip presses against the O-ring and provides a seal between the surfaces. Alternatively, the O-ring groove may be made in the face surface 25 and the protruding lip may be made on the face surface 27. Thus, the two shuttles are substantially identical except for the differences noted above.

A control chamber 46 is formed near the front end of the housing 20 while a chamber 47 is formed near the rear or back end. Control chamber 46 is defined by an annular member 38, the body 20 and O-ring seals 42 and 43. The member 38 is connected to the housing so that there exists an annular air chamber between the housing 20 and the member 38. The O-ring seal 42 is formed in the member 38 while the O-ring seal 43 is formed in the housing 20. The annular air chamber 46 is made sufficiently long so that it can slideably accommodate the tail or back end 34 of the shuttle 24. The end 34 is adapted to reciprocate or stroke and remain inside the control chamber 46. The seals 42 and 43 prevent fluid from escaping through the chamber 46. Similarly, the tail end 36 of the second shuttle 26 is adapted to sealing reciprocate or stroke inside the control chamber 47, which is defined by the member 40 and O-ring seals 44 and 45. When the shuttles 24 and 26 move away from each other, their respective tail ends move inside their associated control chambers 46 and 47 respectively. An end piece 48 is attached to the front end of the housing to securely hold in place the member 38. Similarly, an end piece 49 is removably attached to the back end of the housing to securely hold the member 40 in place.

A removable ring 18 is placed in the back end of the chamber. The shape of the member 18 is such that the main chamber 22 is symmetrical about its geometrical center plane. An O-ring seal 16 is provided between the member 18 and the chamber 22. The end piece 49 holds member 18 in place.

One-way control valves 81 are connected between the main chamber 22 and each of the control chambers, 46 and 47. Each control valve is adapted to open and discharge air from its associated control chamber to the main chamber 22 when the pressure in the control chamber exceeds a predetermined value.

Pressurized air is supplied to the main chamber 22 and the control chambers 46 and 47 through an input port 60 via a passage tube 62. Port 64, connected to the passage tube 62, supplies the high pressure air to the control chamber 46, while a port 66 connected to the line 62 supplies the high pressure air to the control chamber 47. An orifice 68, which is smaller in diameter than the port 64 or 66 supplies the high pressure air from the passage tube 62 to the main chamber 22.

A control valve 70, preferably a solenoid control valve, is attached to the front end of the air gun. The control valve 70 has an enclosed air chamber 72 and a poppet 73. A feed line 74 supplies air from the main chamber 22 to the chamber 72. A common feed line 76 supplies air from the chamber 72 to firing chambers 78 and 80 via ports 90 and 92 respectively. Firing chamber 78 is made between the body 20 and the sleeve 24. Seals 43 and 50 ensure that the air in the firing chamber 78 is sealed from the surrounding medium. Similarly, the firing chamber 80 is made between the housing 20 and the sleeve 26, and seals 44 and 52 seal the air in the firing chamber 80 from the surrounding medium.

The operation of the air gun will now be described while referring to FIG. 1 and 2. High pressure air enters the air gun through the port 60. Both control chambers 46 and 47 are filled with the air before the main chamber 22 is filled because the orifice 68 restricts the air passage to the chamber 22 and also because the chamber 22 is substantially larger than the control chambers 46 and 47. The high pressure air in the control chambers 46 and 47 respectively exerts pressure on the back ends of the shuttles 24 and 26, urging the face surfaces 25 and 27 against each other thereby sealing the main chamber 22 from the surrounding medium about the face seal 30. The shuttles 24 and 26 stay closed while the main chamber 22 is being filled with pressurized air and also after it has been filled with the air. The surface area described by the seals 42 and 43 is made larger than the area described by the seal 50 and the face seal 30, so that a positive pressure is exerted on the back end of the shuttle 24, pushing it toward the shuttle 26. Similarly, the surface area defined by the seals 44 and 45 is made larger than the area defined by the seal 52 and the face seal, so that a positive pressure is exerted on the back end of the shuttle 26 pushing the shuttle 26 toward shuttle 24. Thus, when pressurized air is supplied to the port 60, both shuttles are continuously urged against each other, causing the air gun to remain closed. Therefore, as long as the high pressure air is supplied to the port 60, the air gun remains closed, i.e., the main chamber remains filled with the higher pressure air.

To fire or open or actuate the shuttle so as to discharge the high pressure air from the chamber 20 to the surrounding medium, the poppet 73 is momentarily opened, which allows the high pressure air to flow from the chamber 22 to the firing chambers 78 and 80 via the feed line 76 and ports 77 and 79 respectively. This sudden discharge of high pressure air into the firing chambers simultaneously imbalances the shuttles 24 and 26 from their stable closed position against the face seal 30 by momentarily separating the shuttles allowing the high pressure air from the chamber 22 to pass through the gap created between the shuttles 24 and 26. As the high pressure air starts to pass through the gap, it forces the shuttles 24 and 26 to abruptly and simultaneously move away from each. The high pressure air from the main chamber 22 floods across the interface between the surfaces 25 and 27 which abruptly drives the shuttles 24 and 26 away from each other, thereby suddenly increasing the air gap. The pressurized air discharges into the surrounding medium. The simultaneous movement of both the shuttles away from each other and centering of the shuttle interface surface 31 about the geometrical volume of the high pressure air chamber 22 ensures a very rapid discharge of substantially all of the high pressure air from the air chamber 22 into the surrounding medium.

After substantially all the air from the chamber 22 has escaped, the control chambers 46 and 47 cause the shuttles 24 and 26 to return to their closed position.

A prototype air gun according to the preferred embodiment described herein has been made which can be adapted to release air between 40 to 300 cubic inches during each firing. The length of the prototype gun is about the same as a conventional air gun having a maximum capacity of about 150 cubic inches. Centering the seal interface 31 about the geometric volumetric center of the air chamber and simultaneously moving the shuttles away from each other allows the air gun of the present invention to release a given volume of the air in about one-half the time compared to the conventional air guns using a single shuttle. Furthermore, this air gun is lighter, utilizes fewer parts and is easier to manufacture, assemble and disassemble than the conventional air guns.

As noted earlier, the most frequent failure of the sleeve type air guns is due to the failure of the face seal, like the seal 30. To install a new O-ring seal or to replace the shuttle 26 which houses the O-ring seal, merely detaching the member 49 allows the annular member 40 and the shuttle 26 to slide out of the housing 22. After replacing the O-ring, the procedure is reversed to reassemble the air gun.

Figure 3:
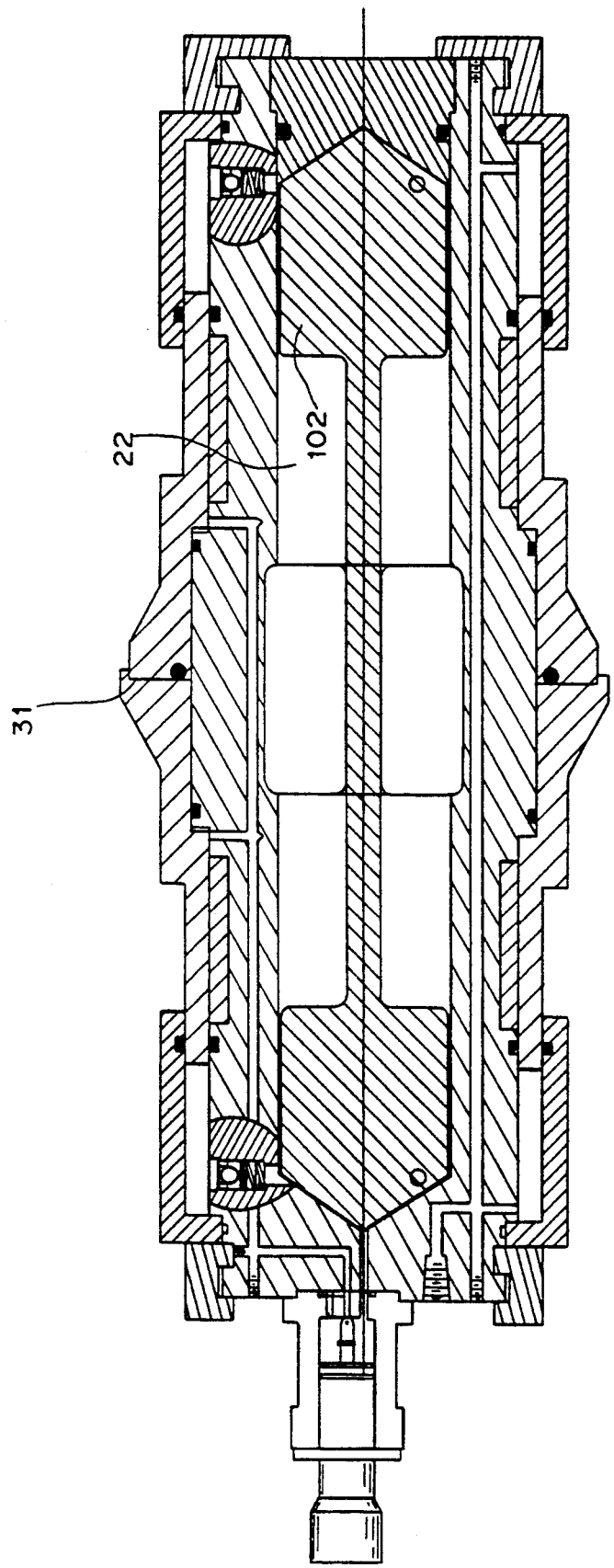
FIG. 3 shows a cross-sectional view of the seismic energy source of FIG. 1 with a single insert placed in its main chamber.
Figure 4:
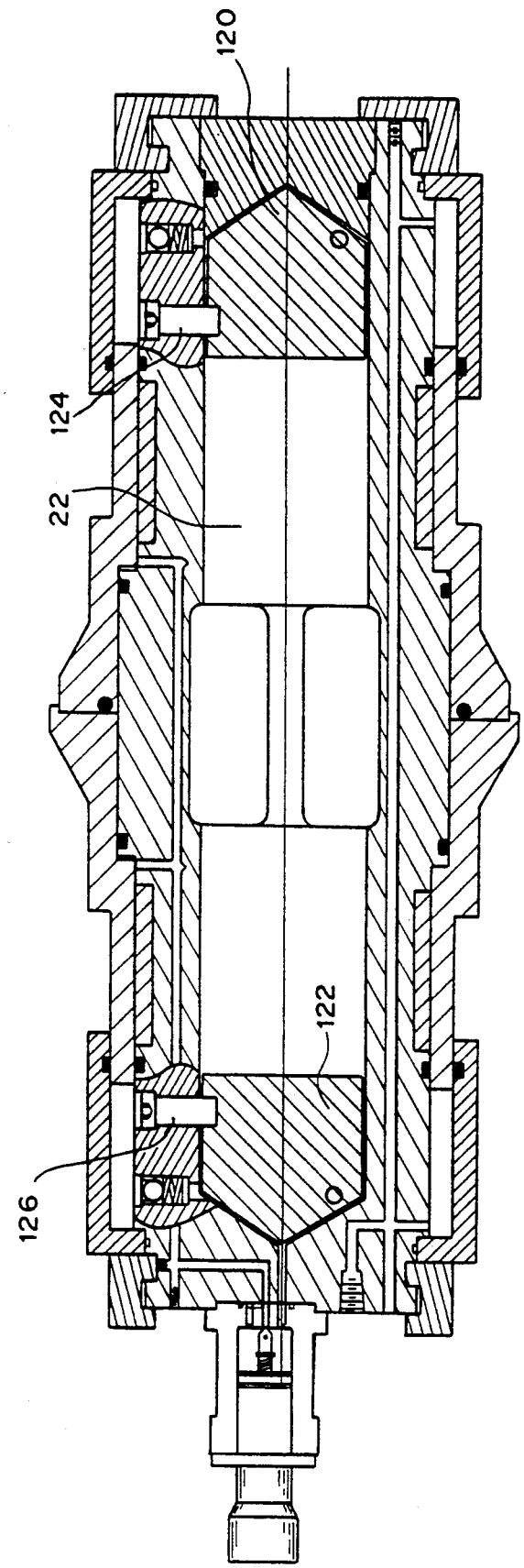
FIG. 4 shows a cross-sectional view of the seismic energy source of FIG. 1 with same-sized inserts placed at the outer ends of the main chamber.

As noted earlier, the volumetric capacity of the main chamber defines the capacity of the air gun. When an air gun with a smaller capacity is desired, solid inserts of varying configurations may be placed within the main chamber to reduce the capacity of the air gun. FIGS. 3 and 4 show two alternate methods of varying the air gun capacity. In the configuration shown in FIG. 3, a single solid member insert 102 is placed inside the chamber 22. The member 102 is preferably in a manner which maintains the main chamber substantially symmetrical about a plane as defined by the interface Surface 31. Furthermore, the inserts are preferably placed at the outer ends of the main chamber, which ensures that there is little or no obstruction for the pressurized air to escape through the interface 31 when the gun is fired.

FIG. 4 shows an alternate method of reducing the air gun capacity. In FIG. 4, separate but equal-sized (volume) members 120 and 122 are respectively attached at each inner end of the main chamber 22 by their associated screws 124 and 126.

The foregoing description is directed to a particular embodiment of the invention for the purpose of illustration and explanation. It will be apparent, however, to one skilled in the art that many modifications and changes to the embodiment set forth above are possible without departing from the scope and the spirit of the invention. For example seals other than the O-ring type seals may be used, or various other configurations of inserts to alter the chamber volume may be designed. It is intended that the following claims be interpreted to embrace all such modifications and changes.

What is claimed is:

1. An energy source, comprising:
   (a) a housing having a chamber for storing a compressed fluid;
   (b) two shuttles facing each other slidably placed around the chamber;
   (c) means for urging the shuttles against each other; and
   (d) a separate firing means associated with each said shuttle for simultaneously moving the shuttles away from each other.

2. An energy source, comprising:
   (a) a housing having a chamber for storing compressed fluid;
   (b) two shuttles slidably placed around the housing, said shuttles facing each other and forming a seal therebetween when said shuttles are urged against each other;
   (c) means for urging the shuttles against each other; and
   (d) a separate firing chamber associated with each said shuttle for simultaneously moving its associated shuttle away from the other shuttle.

3. An energy source, comprising:
   (a) a housing having a chamber for storing compressed fluid, said chamber being in fluid communication with the medium surrounding the housing;
   (b) two shuttles slidably placed around the housing, each said shuttle separately armed to urge that shuttle against the other shuttle to form a seal therebetween;
   (c) separate firing chamber associated with each said shuttle for simultaneously disarming its associated shuttle to form a gap between the shuttles so as to allow the pressurized fluid to discharge through said gap into the surrounding medium; and
   (d) means for selectively and substantially simultaneously supplying pressurized fluid to each of the firing chambers for disarming the shuttles.

4. An energy source for use in marine geophysical surveying, comprising:
   (a) a housing having a chamber for storing compressed air, said chamber being in air communication with the surrounding medium;
   (b) two shuttles facing each other slidably placed around the housing, the shuttles forming an air seal between the surfaces facing each other when the shuttles are pressed against each other about the geometric volumetric center of the chamber;
   (c) a separate control chamber associated with each said shuttle urging its associated shuttle against the other shuttle; and
   (d) a separate firing chamber associated with each said shuttle for moving its associated shuttle away from the other shuttle so as to cause an air gap to form between the shuttle, thereby discharging the compressed air from the chamber into the surrounding medium.

5. An energy source for producing pressure pulses, comprising:
   (a) a housing having a main chamber for storing a fluid, said main chamber being in fluid communication with the surrounding medium about the periphery of the housing;
   (b) two shuttles slideably placed around the housing to face each other, said shuttles forming an air seal between them when pressed against each other;
   (c) a separate control chamber associated with each shuttle for simultaneously exerting pressure on its associated shuttle to urge it against the other shuttle;
   (d) a separate firing chamber for each shuttle formed between the shuttle and the housing for causing the shuttles to simultaneously move away from each other;
   (e) a feed line for supplying compressed air to each of the firing chamber; and
   (f) a separate relief valve connected between each control chamber and the main chamber for discharging the fluid from its associated control chamber into the main chamber when the pressure in the control chamber exceeds the pressure in the main chamber by a predetermined value.

6. An air gun for use in seismic surveying, comprising:
   (a) a housing having a main chamber for storing compressed air, said main chamber being substantially symmetrical about a plane passing through the geometric volumetric center of the main chamber;
   (b) two substantially identical shuttles, each said shuttle having an inner and outer end, each shuttle slideably placed around the housing and adapted to form a seal between the inner ends about the plane through the geometric volumetric center of the main chamber when the shuttles are urged against each other;

(c) a separate control chamber for sealingly and slideably housing the outer end of each shuttle, each control chamber adapted to receive compressed air and in response thereto simultaneously exerting sufficient force on its associated shuttle to form the seal between the shuttles;

(d) means for supplying pressurized air first to both control chambers and then to the main chamber; and (e) a separate firing chamber associated with each shuttle formed between the shuttle and the housing, each firing chamber adapted to selectively receive pressurized air and in response thereto causing its associated shuttle to abruptly move away from the other shuttle, causing an opening around the main chamber about the plane through the geometric volumetric center of the main chamber, thereby causing the pressurized air to discharge from the main chamber into the surrounding medium.

* * * * *